(12) United States Patent
Malocha et al.

(10) Patent No.: US 9,172,423 B1
(45) Date of Patent: Oct. 27, 2015

(54) CORRELATOR TIME DELAY EXTRACTION FOR WIRELESS ACOUSTIC SENSORS

(75) Inventors: Donald Malocha, Winter Springs, FL (US); Nikolai Kozlovski, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 795 days.

(21) Appl. No.: 13/462,051

(22) Filed: May 2, 2012

Related U.S. Application Data

(60) Provisional application No. 61/481,434, filed on May 2, 2011.

(51) Int. Cl.
   *G01S 1/72*  (2006.01)
   *H04B 1/707* (2011.01)
(52) U.S. Cl.
   CPC ..................... *H04B 1/707* (2013.01)
(58) Field of Classification Search
   CPC ....................................................... H04B 1/707
   USPC ................................. 367/117; 375/200, 206
   See application file for complete search history.

(56) References Cited

U.S. PATENT DOCUMENTS

| | | | | |
|---|---|---|---|---|
| 5,761,238 A | * | 6/1998 | Ross et al. | 375/130 |
| 7,580,488 B2 | * | 8/2009 | Young | 375/347 |

* cited by examiner

*Primary Examiner* — Mark Hellner
(74) *Attorney, Agent, or Firm* — Jetter & Associates, P.A.

(57) ABSTRACT

Methods, systems and devices for correlator time delay extraction for wireless acoustic wave devices. A receiver receives an analog signal as a sum of plural different analog coded signals each having a different time delay and matched filters corresponding to the acoustic devices is used to extract the time delay to recover the original plural different analog coded signals. In an embodiment the acoustic devices generate orthogonal-frequency codes signals with block-time-diversity to reduce the cross-correlation "noise" due to multi-codes. The time diversity spreads the tags ensemble energy in time, thereby reducing the time energy density. An estimate of the delay time using the passband frequency phase slope, or in the time domain by using the correlation peak, is obtained.

19 Claims, 16 Drawing Sheets

US 9,172,423 B1

CORRELATOR TIME DELAY EXTRACTION FOR WIRELESS ACOUSTIC SENSORS

This application claims the benefit of priority to U.S. Provisional Application No. 61/481,434 filed on May 2, 2012.

FIELD OF THE INVENTION

This invention relates to surface acoustic wave devices and, in particular, to methods, systems and devices for coherent time delay correlation extraction at the receiver of a multi-device system wherein each device generates and transmits a different analog coded signal with a time delay.

BACKGROUND AND PRIOR ART

The use of orthogonal frequencies for a wealth of communication and signal processing applications is well known to those skilled in the art. Orthogonal frequencies are often used in an M-ary frequency shift keying (FSK) system. There is a required relationship between the local, or basis set, of frequencies and their bandwidths that meets the orthogonality condition. If adjacent time chips have contiguous local stepped frequencies, then a stepped chirp response is obtained.

Other orthogonal frequency coding techniques by the same inventor, and assigned to the same assignee, include U.S. Pat. No. 7,642,898 which disclosed a novel spread spectrum coding that uses orthogonal frequency coding (OFC) for surface acoustic wave identification tags and sensors which enables unique sensor operation and identification in multi-sensor environments. The OFC technique provided a wide bandwidth spread spectrum signal with all the inherent advantages obtained from the time-bandwidth product increase over the data bandwidth.

U.S. Pat. No. 7,623,037 issued to the same inventor, and assigned to the same assignee, teaches weighted SAW gratings for coding identification tags and sensors for a multi-sensor environment. In an embodiment, the weighted reflectors are variable while in another embodiment the reflector gratings are apodized. The weighting technique allows the designer to decrease reflectively increases coding diversity.

U.S. Pat. No. 7,623,037 issued to the same inventor, and assigned to the same assignee, teaches UCF-560CIP teaches a method to mitigate code collisions in a wireless multi-tag system, each one of the OFC surface acoustic wave devices generating an orthogonal frequency coded signal for identification The co-inventors previously published results showing that the cross correlation between differing orthogonal frequency coded frequency chips yield reduced correlation sidelobes compared to conventional Code Division Multiple Access (CDMA). The co-inventors have also discussed the use of both frequency division (FD) between tags and time division (TD) of chips in tags. Both of these approaches were considered since each provides greater diversity of coding in a multi-sensor system. Both approaches also provide some measure of orthogonality, based on the implementation technique, over and above that of just OFC coding.

The present invention solves the problem of extracting time delays injected into plural coded signals in a multi-device system that generates and transmits a coded signal in response to an interrogation signal. The analysis assumes all tags of equal signal strength received at the antenna, having a known single range. The present invention uses correlator time delay extraction with matched filters to remove the block time delay to recover each original coded signal.

SUMMARY OF THE INVENTION

A primary objective of the present invention is to provide methods, systems and devices for correlator time delay extraction at the receiver of a multi-device system wherein each device generates and transmits a different analog coded signal with a time delay.

A secondary objective of the present invention is to provide methods, systems and devices for extracting a time delay injected into each analog coded signal in a multi-device system where each device generates and transmits its different analog signal with a delay in response to an interrogation signal.

A third objective of the present invention is to provide methods, systems and devices for correlator time delay extraction for wireless acoustic sensors in a multi-sensor system.

A method for correlation time delay extraction from coded signals in a multi-device system can include the steps of receiving an analog coded signal HR(f) that is a sum of plural different coded device response signals from each device in the multi-device system, each different coded device response signal each having a time delay, and match filtering each of the received plural different coded signals to extract the time delay from each different coded response signal to recover each original different coded signal.

The receiving step can include the steps of converting the received analog coded signal HR(f) to a digital data signal in a time domain, and Fourier transforming the digital data to obtain a time domain auto-correlation peak.

The method can further include the step of calibrating each matched filter to one of the plural different coded signals to improve the delay extraction.

The matched filtering step can include the steps of processing a magnitude of each received different coded device response signal, and processing a phase of each received different coded device response signal to eliminating an imaginary term by extracting the time delay from each received different coded device response signal.

The method can further include the steps of estimating the delay time using a passband frequency phase slope in the frequency domain, and creating a delay matched filter.

The method can further include the steps of estimating of the delay time using the correlation peak in the time domain, and creating a delay matched filter signal with an auto-correlation peak occurring at approximately t=0.

The method can further include the step of multiplying a last one of the matched filters to the transformed digital data signal to obtain a compressed filter correlation response.

The method can further include the step of multiplying the compressed filter correlation response by a time sweep to determine a real part of the time delay.

The method can further include the step of summing the real part of the time delay for each compressed filter correlation response to obtain an optimum time delay.

The method can further include the step of converting the optimum time delay from the time domain to a frequency domain.

A correlated time delay extraction for acoustic devices in a multi-device system can include plural acoustic devices each generating and transmitting a different analog coded signal in response to receiving an interrogation signal, each different coded signal having a time delay to spread a device energy in time in the multi-device system, a receiver for receiving an analog signal as a sum of the plural different analog coded signals, the receiver including a processing device including memory for storing and executing a set of instructions to extract a correlated time delay, and a correlator time delay extractor including a matched-filter corresponding to each one of the different coded signals to extract the time delay for recovering recover the original different analog coded signals.

The receiver can include a converter to convert the received analog coded signal to a digital data signal.

The set of instructions can include a first set of instructions to Fourier transform the digital data signal from a time domain to a frequency domain.

The system can include a second set of instructions to multiply a last one of the matched filters to the transformed digital data signal to obtain a compressed filter correlation response.

The system can include a third set of instructions to multiply the compressed filter correlation response by a time sweep to determine a real part of the time delay.

The system can include a fourth set of instructions to sum the real part of the time delay for each compressed filter correlation response to obtain an optimum time delay.

The system can include a fifth set of instructions to convert the optimum time delay from the time domain to a frequency domain.

A correlated time delay extraction system can include a receiver to receive an analog signal as a sum of plural coded signals each having a different time delay generated and transmitted from plural acoustic devices in response to an interrogation, and a matched filter corresponding each acoustic device coded signal to remove each different time delay to recover each original coded signal.

The receiver can include a detector in the time domain to convert the received analog signal to a digital signal data, a time gate to limit a time window to an ith acoustic device, and a Fourier transforming device to transform the digital data signal from the time domain to a frequency domain.

The detector can include an analog to digital converter.

The matched filter can include a matched filter multiplier for multiplying each transformed digital data signal by an ith matched filter to obtain an approximate compressed filter correlation response data, a time sweep multiplier to multiply the approximate compressed filter correlation response data by a swept time delay in frequency to determine a real part of the time delay, and a summing device to sum the results from each next one of the plural coded signal to find an optimum delay.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

One skilled in the art should realize that the particularities in the correlator time delay extraction for wireless acoustic devices should not be construed as limitation of the preferred embodiment. Various device coding techniques and corresponding system components may be chosen and optimized for a particular application to achieve a desired performance and other methods of signal coding with block time delay diversity can be substituted for the described orthogonal frequency coding.

First, block Orthogonal Frequency Coding (OFC) without Time Diversity (TD) is explained. To show the key points of the present invention, a 5 chip, 32 tag multi-sensor system is discussed and shown for purpose of illustration. The results show 32 tags having differing randomly generated OFC-PN (pseudo noise) codes where Block Time Diversity (BTD) is not applied. All of the tags are assumed to have identical arbitrary delay offsets of approximately 4.5 chips for this example. The tags each have 5 OFC chips starting at the same relative time and having the same exact lengths, however, the PN sequence and OFC sequence vary.

Figure 1:
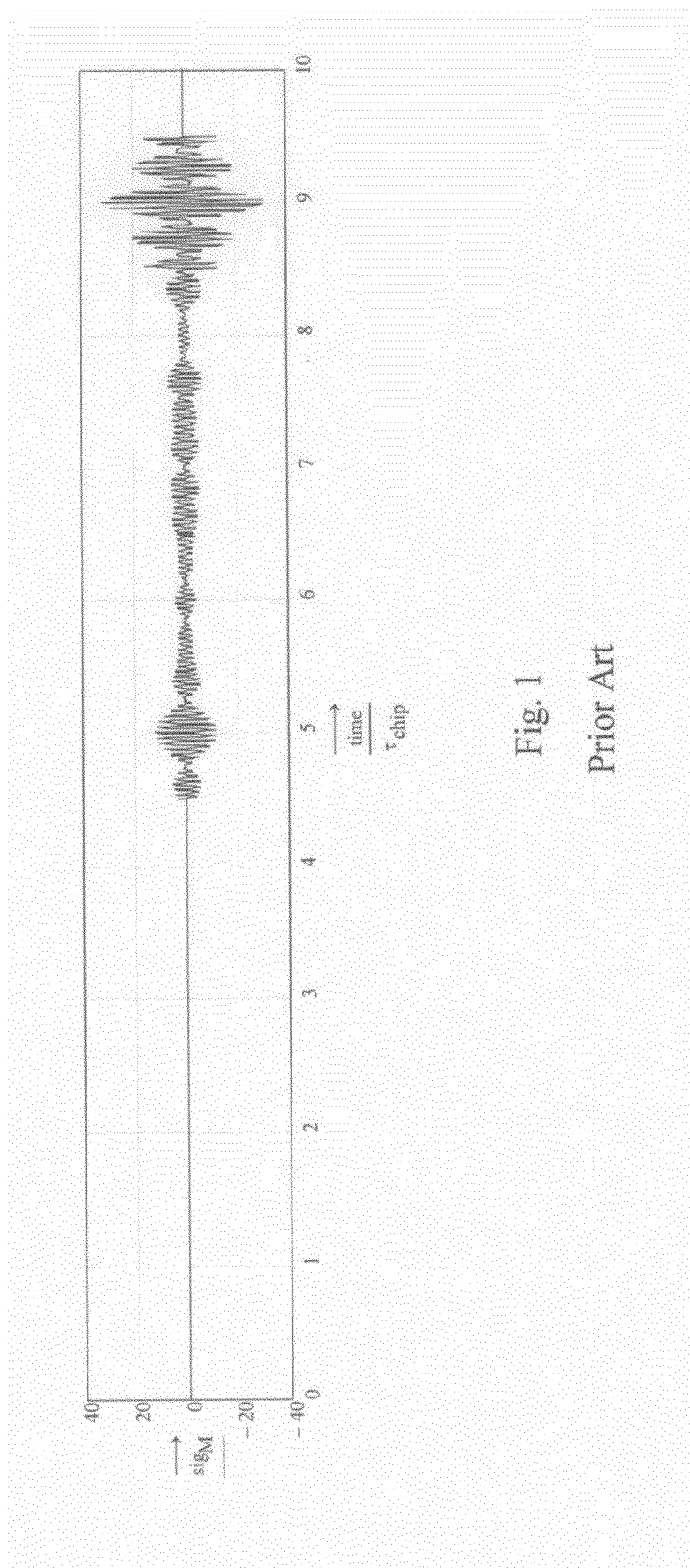
FIG. 1 is a plot showing the sum of all of the OFC-PN codes as seen at the antenna in a prior art system.

FIG. 1 is a plot showing the sum of all of the OFC-PN codes as seen at the antenna in a prior art system. The time delay offset is completely arbitrary and was set for convenience of plotting; the signal length is 5 chips since all codes arrive simultaneously in time at the antenna. The signal looks like noise, as expected, over the expected time duration.

Figure 2:
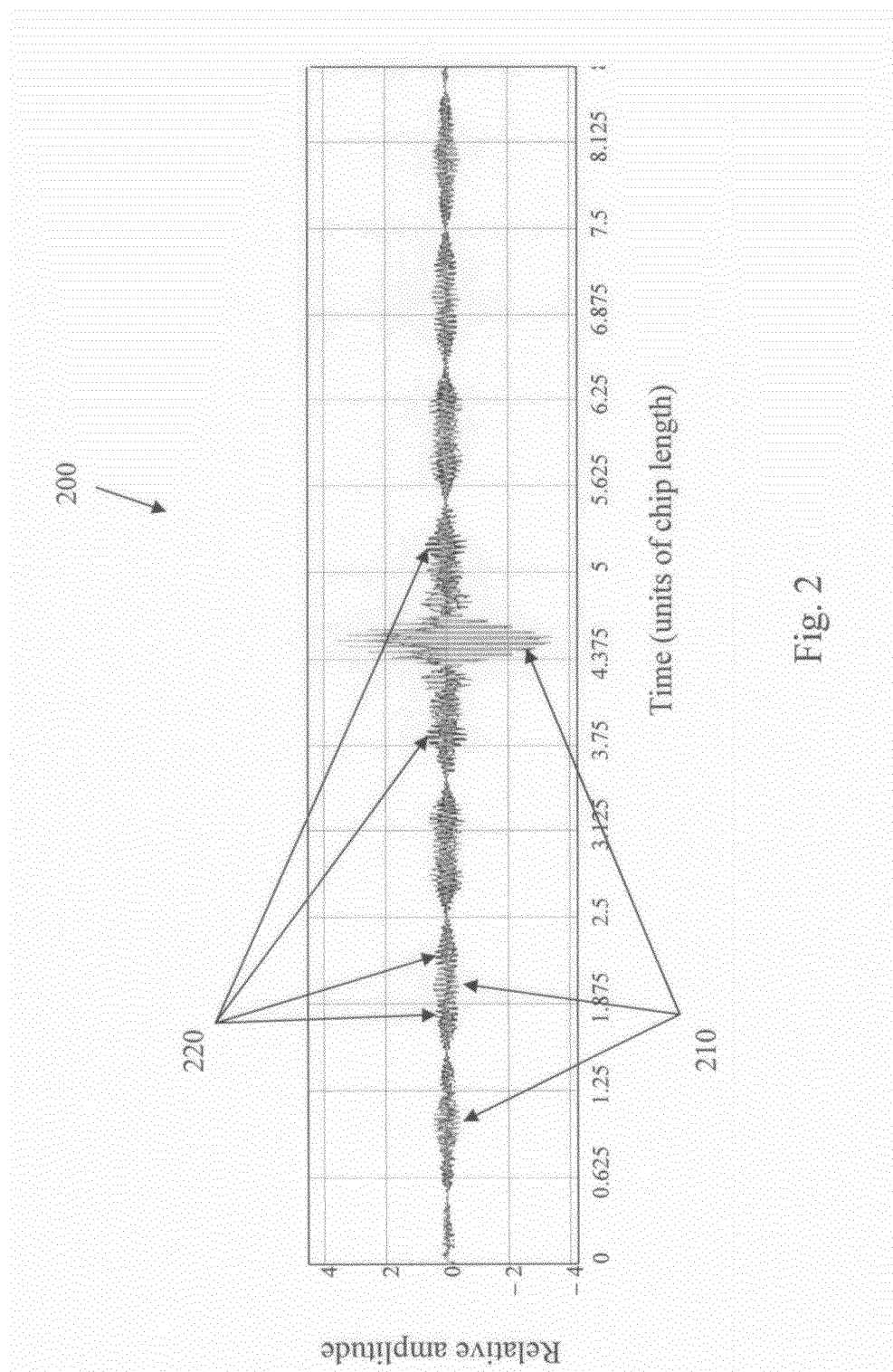
FIG. 2 is a plot showing the superposition of the five correlation peaks, all occurring at the same time.

FIG. 2 is a plot 200 showing the superposition of the 5 correlation peaks for two traces, again all occurring at the same time as expected. The peaks 210 fall onto each other and appear one trace while the sidelobes 220 shown as are slightly different, but the side lobes are not of interest. The time length in the example shown is 5 chips, as expected.

Figure 3:
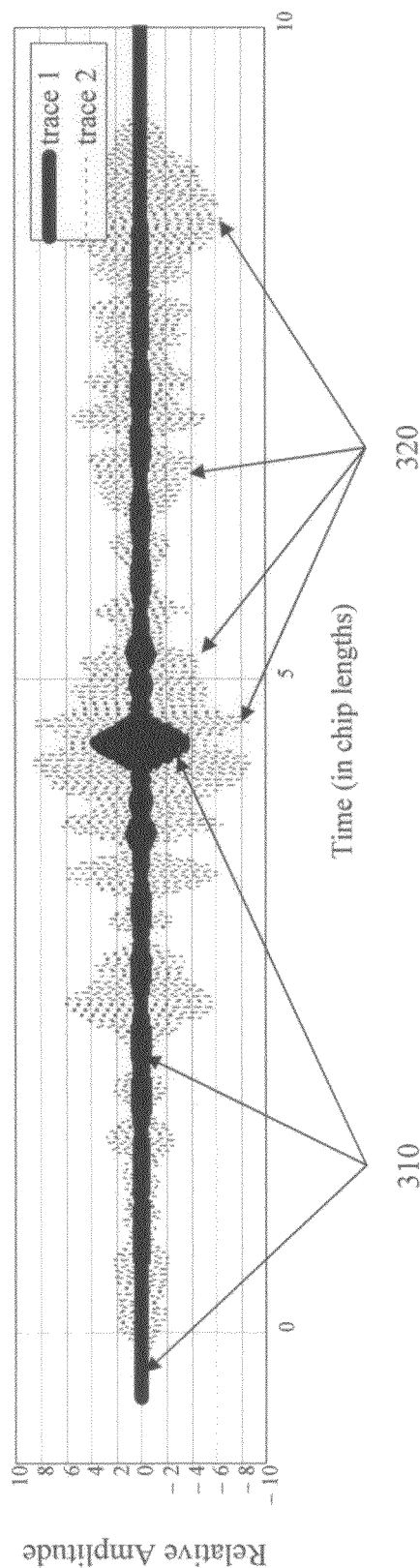
FIG. 3 is a plot showing the autocorrelation of a desired tag, and the cross correlation of the desired tag with the sum of all other tags.

FIG. 3 is a plot showing the autocorrelation of a desired tag 310, and the cross correlation of the desired tag 310 with the sum of all other tags 320. As is evident, there is no discernable autocorrelation peak and it is clearly below the cross-correlation "noise". This is a simple demonstration of the problem to be solved. The conclusion of the inventor is that there must be time diversity, in addition to the OFC diversity, in the system. The problem is that the cross-correlation will be stationary over a range of measurement cycles, but unpredictable. Therefore, a way to reduce the cross-correlation "noise" due to multi-codes is to reduce the number of tags, eliminate the cross-correlation effect one tag at a time, and/or spreading the system tag energy in time. The methods and systems of the present invention implements spreading the system tag energy in time.

For block coding with time diversity in the system BTD, the total number of tags is treated as a complete system and then the system is optimized as a whole. The most critical issue is the minimization of the cross-correlation noise without being overly concerned about the auto-correlation characteristics, at least to the first order. The realization is that the cross-correlation noise is the primary factor limiting the number of OFC tags in a passive wireless multi-sensor system, and optimization of one single or a few channels does not result in good overall system performance. The same system as previously described is extended using BTD.

For the first BTD example, each OFC-PN code is offset by 1 chip length in time. For example, the first OFC-PN code is offset by 1 chip length. The next OFC-PN code is offset by 2 chip lengths, and so on. This has the effect of reducing code collisions for the ensemble, but lengthens the overall system time length. The system time length, calculated as the received signal at the antenna, in this example is now 36 chips long. The time delay offset is arbitrary, but for this example, the idealized device time length is approximately 10 chips long in time; the last device is 43 chips long, with the last 5 chips having the code and the rest is propagation delay. The time diversity spreads the tags ensemble energy for the system in time, thereby reducing the time energy density. This is accomplished, however, at the expense of longer delays in devices, which translates to longer SAW devices to implement the added delays.

Figure 4:
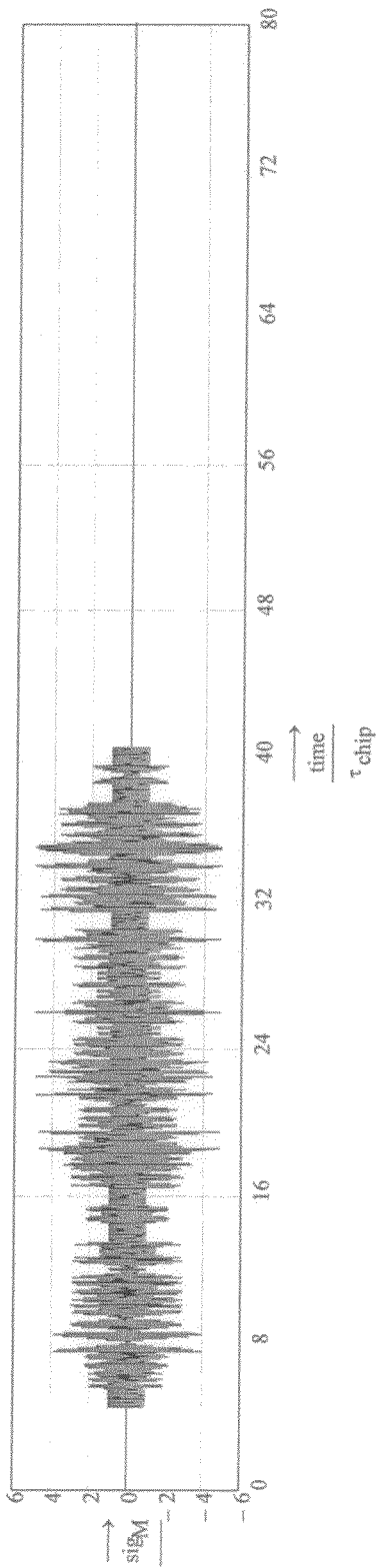
FIG. 4 is a plot showing the sum of all tag responses at the antenna.

The sum of all tag responses for the system at the antenna is shown in FIG. 4 showing a different peak for each different OFC-PN. Similar to the previous examples, the time response appears as noise; however, the time response in this example is longer than the previous case, as expected because each device has a different delay offset.

Figure 5:
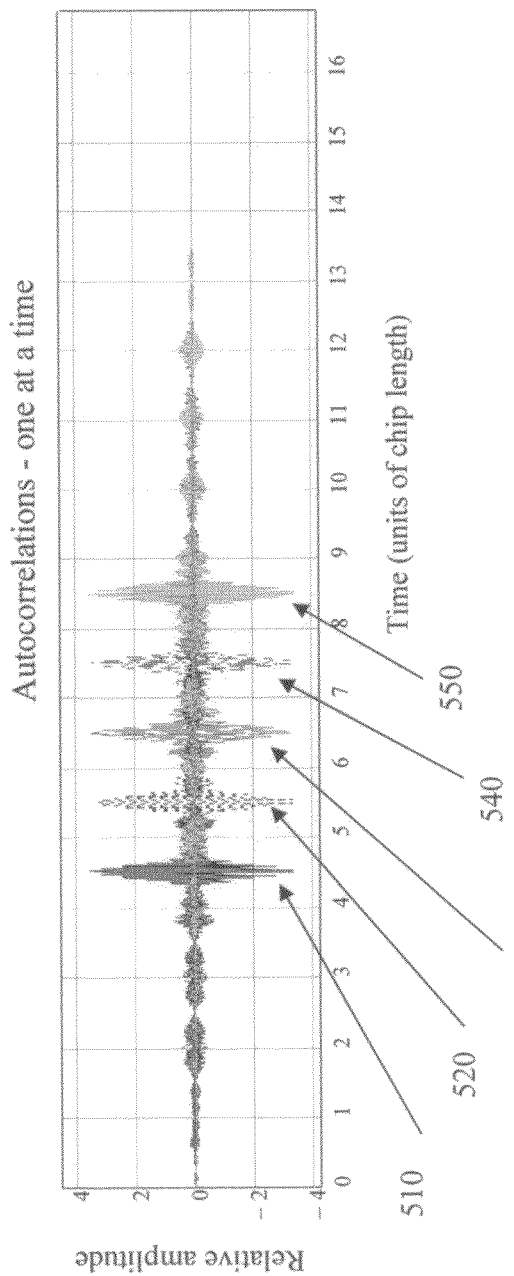
FIG. 5 is a plot showing the autocorrelations of the five shortest time-delay tags.

The autocorrelations of the five shortest time-delay tags 510 (1 time delay), 520 (2 time delay), 530 (3 time delays), 540 (4 time delays) and 550 (5 time delays) are shown in FIG. 5. As expected, the autocorrelations no longer overlay in time, but are each separated by a 1 chip time length. The time delay offset effectively moves the peak autocorrelation into a time bin approximately 1 chip wide. This time domain orthogonality allows unambiguous detection if the cross-correlation noise is at an acceptable level, as long as the autocorrelation peak does not move outside its time bin due to environmental changes or large changes in range. In addition, there are partial overlaps of codes from several sensors, but the autocorrelation peak only overlays closely adjacent time delay sensor responses, thereby reducing time domain energy density around the correlation peak.

Figure 6:
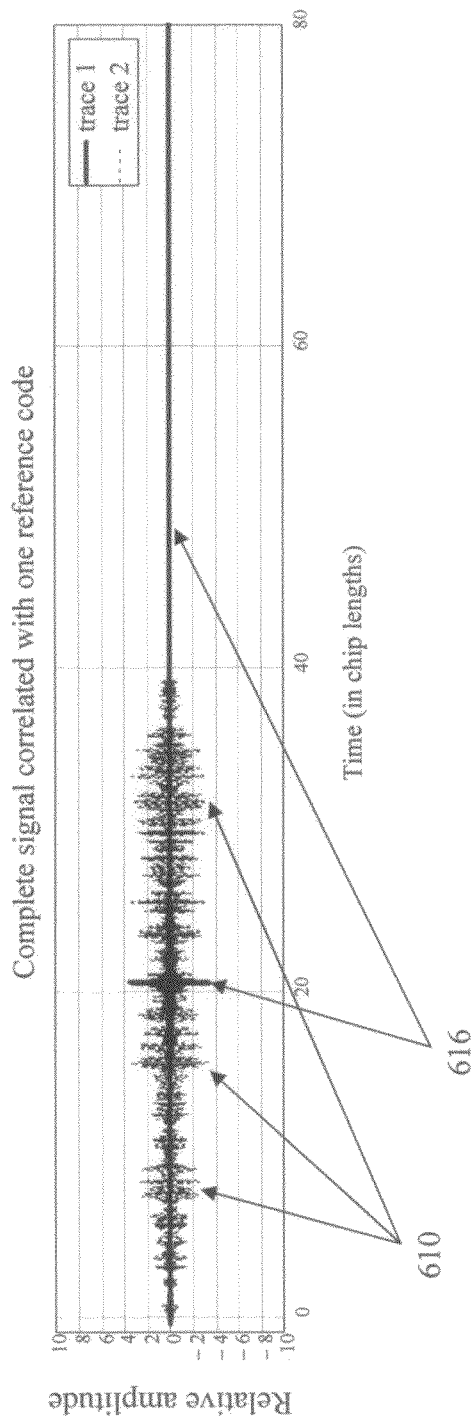
FIG. 6 is a plot showing the complete correlated signal of tag 16, with all other tags present.

The plot shown in FIG. 6 is the complete correlated signal of tag 16, with all other tags present. The ideal predicted auto-correlation 16 highlights the expected height and position of the desired response 616 and the ensemble response 610 has a correlation peak at the desired position. If the position of the desired correlation (616) were unknown, it would not be possible to discern which time peaks to choose. The time orthogonality of the BTD system allows proper detection of the desired signal 616.

Figure 7:
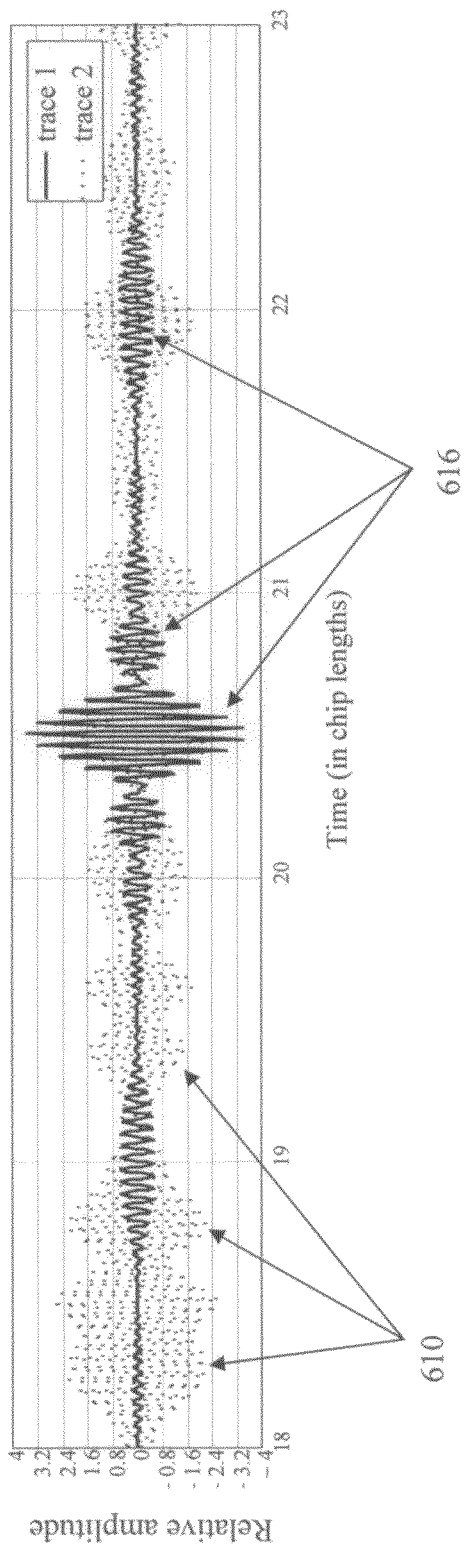
FIG. 7 is a more detailed plot of the correlation region shown in FIG. 6.

A more detailed plot of the correlation region is shown in FIG. 7. The peak pulse 616 is as expected, although the cross-correlation peaks 610 are nearly as large which may not be desirable. However, compared to the previous example, the correlation is certainly discernable.

Figure 8:
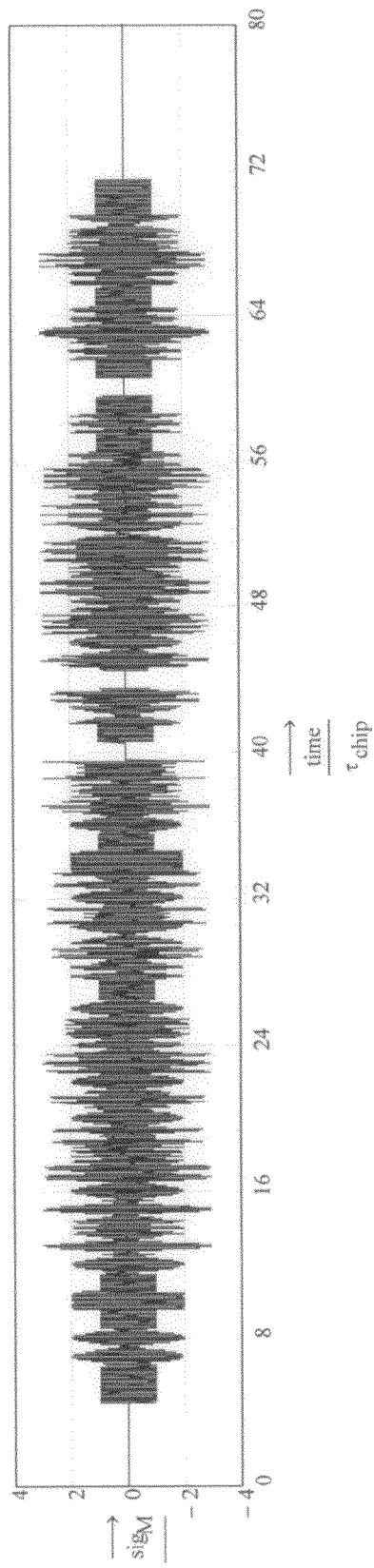
FIG. 8 is a plot showing the sum of the ensemble tag response.

The final example is for a two chip offset BTD, having the same other parameters as the previously example. The sum of the ensemble tag response is shown in FIG. 8. Note that there are quite zones where the sum of all chips is zero due to energy summing to zero from the chip ensemble, as a possibility previously discussed. The ensemble time length is now 67 chips long. If each chip were 100 nsec long, then the system response is 6.7 usec in duration.

Figure 9:
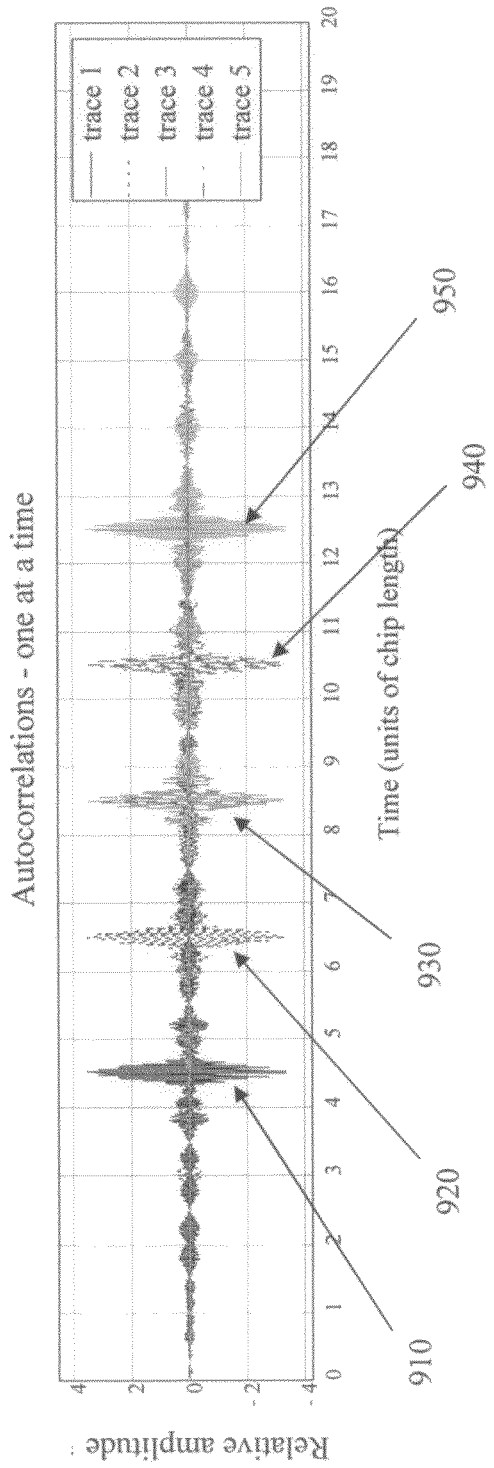
FIG. 9 is a plot showing the autocorrelation of the first five chips separated by two chips.

Referring to FIG. 9, the autocorrelations of the first five chips are separated by an additional chip length when compared to the previous example. The range of the autocorrelation peak can diverge by +/−2 chips from its nominal value without ambiguity.

Figure 10:
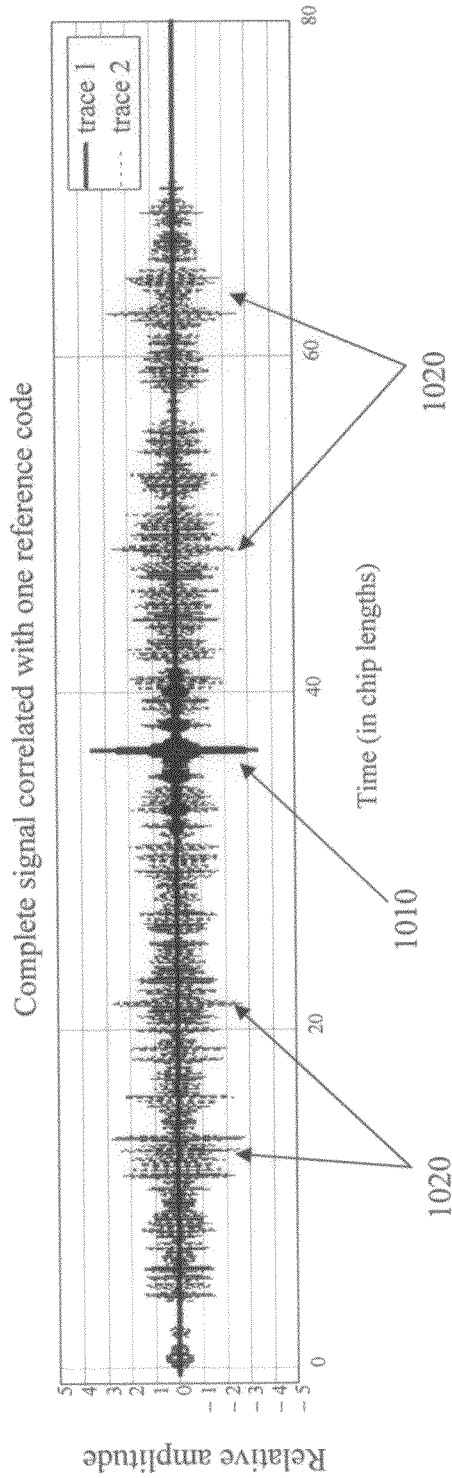
FIG. 10 is a plot showing autocorrelation and correlation of tag 16 with the ensemble.
Figure 11:
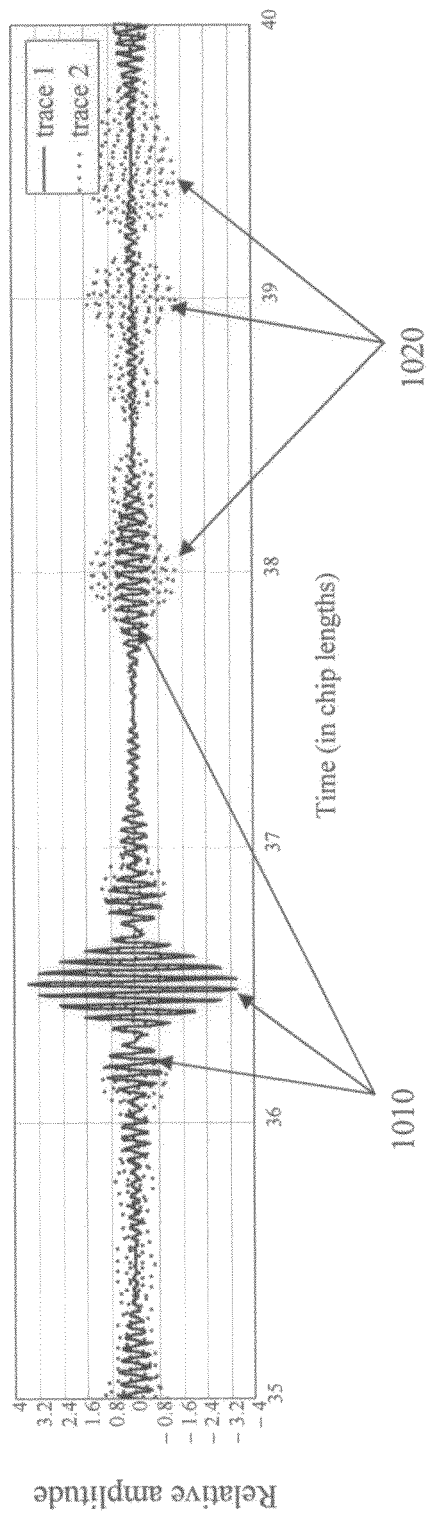
FIG. 11 is a plot showing autocorrelation and correlation of tag 16 with the ensemble.

The autocorrelation 1010 and correlation of tag 16 with the ensemble 1020 are shown in FIG. 10 and FIG. 11. The predicted correlation looks good and the difference in amplitude is due to the chip interactions reducing the energy of the correlation process.

The previous examples show that a 32 tag system, with 5 OFC chips, using a 2 chip delay BTD OFC-PN sequence works at room temperature. The distance between tags should allow operation over at least 100° C. changes in temperature and at least +/1 meter range deviation, without ambiguity of device tag. On a YZ LiNbO3 substrate, assuming a 100 nsec chip length, the longest code plus offset delay distance is approximately 28 mm.

A preferred embodiment of the coherent time delay correlation extraction methods and systems of the present uses a matched filter (MF). The perfect matched filter process provides symmetric time domain pulse compression, regardless of the nature of the signal; the peak of the time domain compressed pulse always occurs at the center of the MF time response; the matched filter is always non-dispersive, even for amplitude, phase or frequency modulated signals; the matched filter yields a linear phased band limited frequency response; and the matched filter has the highest signal-to-noise (S/N) ratio.

Figure 12:
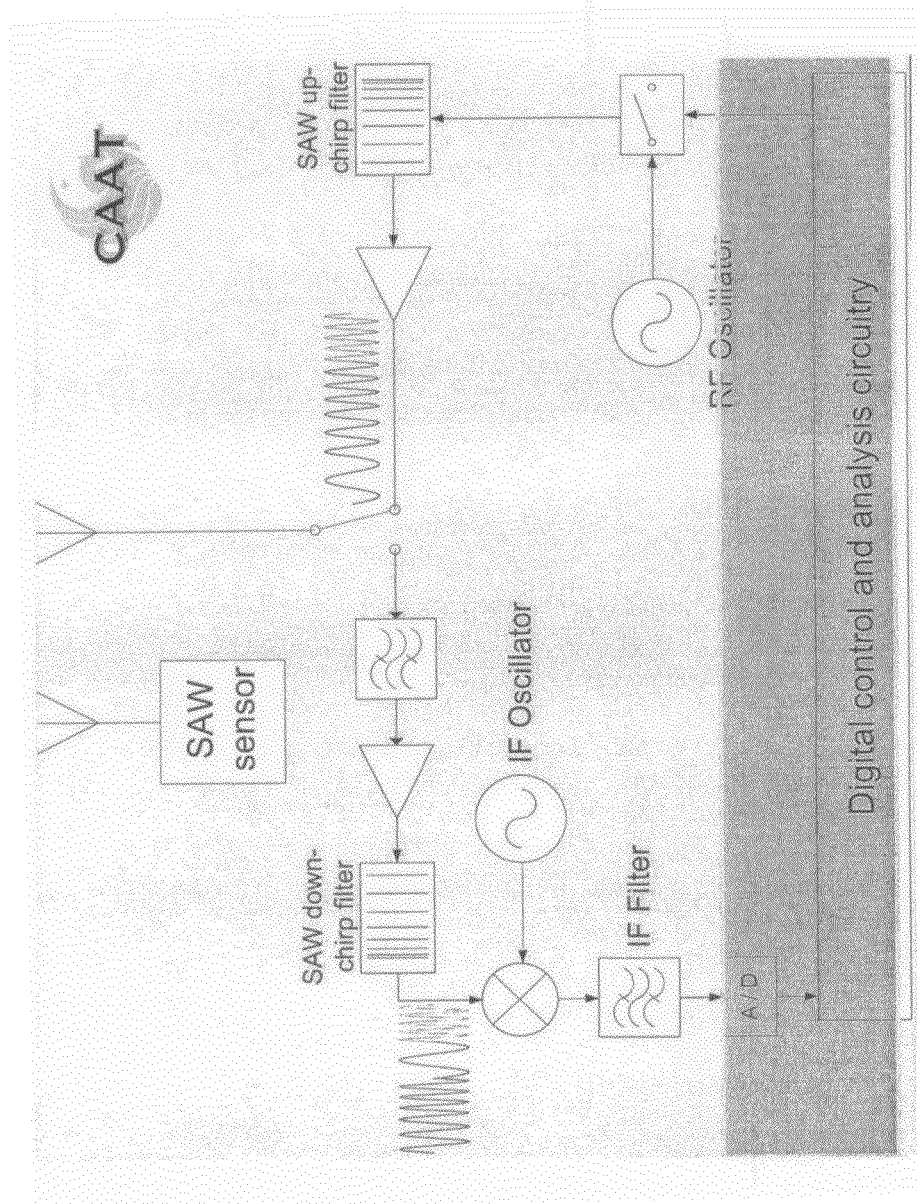
FIG. 12 is a schematic block diagram of a wireless multi-tag system.

FIG. 12 is a schematic block diagram showing wireless multi-tag orthogonal frequency coded system with a Correlator Time Delay Extraction (CTDE) according to an embodiment of the present invention. The surface acoustic wave device receives an interrogation pulse as a chirp or a RF burst. The correlator synchronous receiver involves the integration of multiple "pings" orthogonal frequency coded processing gain. The software based correlation time delay extraction (CTDE) is reconfigurable, allowing the system to be application specific.

Figure 13:
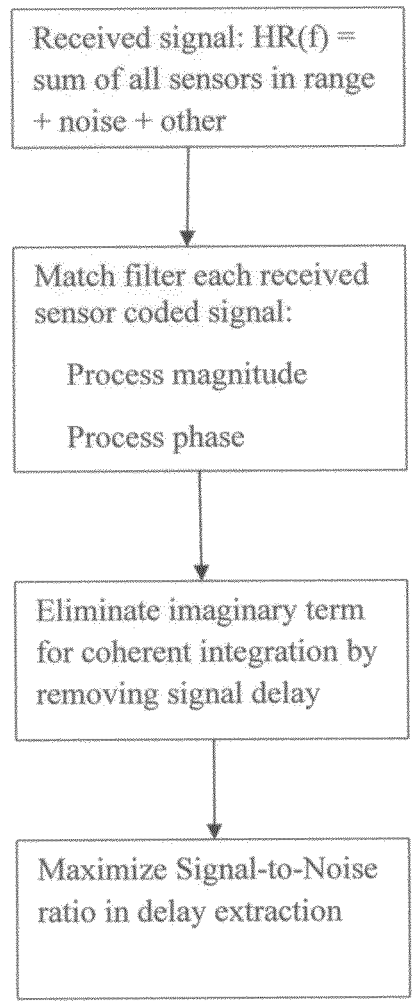
FIG. 13 is a flow diagram showing the step for correlator time delay extraction.

The approach of using correlator time delay extraction is shown in FIG. 13. The received signal HR(f) is equal to the sum of all of the OFC signals from the sensors in the multi-sensor system plus noise plus other such as the error signal associated with each device due to device implementation. The correlator time delay extraction includes a matched filter for each of the received sensor OFC coded signals and the signal magnitude and phase is processed to remove the signal delay. By removing the signal delay, the imaginary term for coherent integration is eliminated and the signal-to-noise ratio in the delay extraction is maximized.

The signal at the receiver, $H_R(f)$, is assumed to have the form $$H_R(f) = \sum_{i=1}^{N}[H_i(f) + E_i(f)]e^{-j2\pi f \tau_{Di}} + H_{CN}(f) + H_{SN}(f)$$

$H_i(f)$ is the ideal-model coded signal expected from each sensor or tag to be used for matched filter correlation.
$E_i(f)$ is the error signal associated with each device due to device implementation and system effects. The error produces amplitude, phase and delay distortions with respect to the ideal signal. If fading is ignored and the channel is assumed stationary, $E_i(f)$ is stationary.
$H_{SN}(f)$ is the random stationary noise which includes AWGN, quantization and other sources.
$H_{CN}(f)$ are all constant sources of additional noise and interference. These can be thought of as external jammers, or signals produced within the transceiver, which are constant with time.
$\tau_{Di}$ is the $i^{th}$ sensor's actual delay when measured accurately with a VNA or other source.

It is understood that demodulation of each signal can be done in any order; but for purpose of this example is assumed to be accomplished sequentially.

Assume a matched filter process, such that, $$G_i(f) = H_R(f) \cdot H_i^*(f)$$

The explicit frequency dependence is dropped from the notation for most terms for simplicity, unless needed. Focusing on the first sensor for extraction of the delay information using a matched filter approach yields $$G_1 = H_1 \cdot H_1^* e^{-j\omega\tau_{D1}} + E_1 \cdot H_1^* e^{-j\omega\tau_{D1}} + \sum_{i=2}^{N}(H_i + E_i) \cdot H_1^* e^{-j\omega\tau_{Di}}$$

$$+ H_{CN} \cdot H_1^* + H_{SN} \cdot H_1^*$$

The first term represents the desired frequency domain auto-correlation of the received signal with its ideal reference. If a fast Fourier transform (FFT) is taken, then the time domain auto-correlation peak would be obtained, along with the other terms which represent noise and may distort the desired peak response. Suitable algorithms can be applied to the data set to extract the time delay.

When peak detection is used, then the accuracy of the extracted delay often relies on a single point determination. The error term $$E_1 \cdot H_1^* e^{-j\omega\tau_{D1}}$$

is due to system, channel or device non-ideal distortion effects of the sensor being demodulated. The summation term $$\sum_{i=2}^{N}(H_i + E_i) \cdot H_1^* e^{-j\omega\tau_{D1}}$$

represents all other sensor-received signals at the antenna. These can represent a large in-band, noise-like term, depending on the number of sensors. The terms $+H_{CN} \cdot H_1^* + H_{SN} \cdot H_1^*$ represent the effects of random thermal noise and any jammers. All of the error and noise terms will result in determining the minimum detectable signal within the correlator receiver.

Coherent Delay Correlation Extraction Technique:

Each device's time delay needs to be extracted. The previously defined block-time-diversity (BTD) coding is assumed to be the coding used throughout the system. Additional other coding techniques can also be superimposed and would not change the basic operation concepts. An estimate of the delay time using the passband frequency phase slope, or in the time domain by using the correlation peak, is obtained. Multiply both sides of the equation by the estimated delay, $\tau_{D_1}$, given a $$GT_1 = G_1 e^{+j\omega(\tau_{D_1} + \Delta\tau_E)} =$$

$$|H_1|^2 e^{+j\omega\Delta\tau_E} + E_1 \cdot H_1^*(e^{+j\omega\Delta\tau_E}) + \sum_{i=2}^{N}(H_i + E_i) \cdot H_1^* e^{-j\omega(\tau_{Di} - \tau_{D_1} - \Delta\tau_E)} +$$

$$H_{CN} \cdot H_1^* e^{+j\omega(\tau_{D_1} + \Delta\tau_E)} + H_{SN} \cdot H_1^* e^{+j\omega(\tau_{D_1} + \Delta\tau_E)}$$

where $\Delta\tau_E$ represents the error in the estimated delay versus the actual delay.

The following is the time delay extraction for the ideal signal. The desired matched filter signal response is contained within the first two terms of $GT_1$. The matched filter response for the desired sensor is defined as $$MF_1 = |H_1|^2(e^{j\omega\Delta\tau_E}) = |H_1|^2 \cdot [\cos(\omega\Delta\tau_E) + j \cdot \sin(\omega\Delta\tau_E)]$$

$\Delta\tau_E \to 0$, $MF_1 \to |H_1|^2$, which indicates that the estimated delay, $\tau_{D_1}$, was exact; then $MF_1$ is purely positive—real, independent of frequency, and maximum value. Based on sampling of the received signal, seldom is it expected that $\Delta\tau_E$ would be zero at all frequencies. Define the Delay Factor, ($CCDF_{MF_1}$) as $$CCDF_{MF_1} = \sum_f \text{Re}[MF_1(f)] / |H_1(f)|^2$$

where the summation is over the frequency band of interest. Maximizing $CCDF_{MF_1}$ yields the best estimate of $\tau_{D_1}$ for a given sampling rate.

Next, find the phase angle of $MF_1$, given as $$\theta_1 = \tan^{-1}\left[\frac{\sin(\omega\Delta\tau_E)}{\cos(\omega\Delta\tau_E)}\right] = \omega\Delta\tau_E$$

Solving for $\Delta\tau_E$ as a function of frequency yields $$\Delta\tau_E(f) = \frac{\theta_1(f)}{2\pi f}$$

Ideally, $\Delta\tau_E$ would be zero and single valued at all frequencies, but it is expected within a real system that $\Delta\tau_E$ will vary. Realistically, to obtain the best estimate of $\Delta\tau_E$, an average over frequency is obtained as $$\Delta\tau_E = \frac{1}{N}\sum_{f=f_1}^{f_N} \frac{\theta_1(f)}{2\pi f}$$

The final best estimate of the delay for device 1 is $$\Delta\tau_{D1} = \Delta\tau_{D1} + \Delta\tau_E$$

If sampling meets the Nyquist criteria, the time delay should be extracted with great precision and accuracy using frequency averaging. The analysis is for the ideal case where there is only 1 device and there are no noise terms.

The constant noise signals identified for analysis consist of three terms. Although the term noise is used, the signals are considered as constant signals over the time interval of interest, and would remain the same in amplitude, frequency and phase if interrogated and then received multiple times. First, due to non-ideal device and system implementation effects, there is an error component associated with the ideal device signal, $E_i$. A second term is a received signal component associated with all other sensors, other than one under analysis. The last component is associated with any in-band constant signals acting as a noise source. In the matched filter analysis, again considering sensor 1 as the example, define $$GE_1 = E_1 \cdot H_1^*(e^{j\omega\Delta\tau_E}) + \sum_{i=2}^{N}(H_i + E_i)\cdot H_1^* e^{-j\omega(\tau_{Di}-\tau_{D1}-\Delta\tau_E)} + H_{CN}\cdot H_1^* e^{j\omega(\tau_{D1}+\Delta\tau_E)}$$

Assuming that a good estimate has been made in the predicted delay, $\Delta\tau_E \approx 0$, and $GE_1$ simplifies to $$GE_1 = E_1 \cdot H_1^* + \sum_{i=2}^{N}(H_i + E_i)\cdot H_1^* e^{-j\omega(\tau_{Di}-\tau_{D1})} + H_{CN}\cdot H_1^* e^{j\omega(\tau_{D1})}$$

The first term in $GE_1$ is expected to yield the most significant error. The signal $E_1$ will be in-band and $E_1 \cdot H_1^*$ will be negative with respect to $|H_1|^2$ over the frequency band of interest, since it is the difference from the exact function. A summation over frequency has no phasor outside the functions themselves, and the term could be a significant value. The relative size of this term, plus its delay will impact the accuracy of the extracted delay. The summation of the second term, due to differing frequency dependent error functions and delays, yields a small term. Also it should be noted, that if the cross correlation properties of the sensors are designed for minimum energy overlap, then $H_1^* \cdot (H_i + E_i)$ will be small. If the last two terms are summed over the in-band frequencies, the net magnitude should approach zero due to the phasor.

There is a stationary noise effect on correlation and delay extraction. The last term in the matched filter signal is the stationary random noise, which is composed of AWGN, system noise and quantization noise, defined as $$G_{SN} = H_{SN}\cdot H_1^* e^{-j(\omega\tau_{D1}+\Delta\tau_E)}$$

This term represents a superposition of random signals and the term $H_1^*$ acts as a bandpass filter to the noise spectrum. $G_{SN}$ is expected to be small and if summed over frequency its effect on delay extraction can be reduced further.

The previous sections have described the correlation and time delay analysis for the ideal single-device system, and for a non-ideal system containing multiple sensors and noise sources. The main purpose of the analysis is to examine correlation techniques to define a strategy for obtaining accurate time delay extraction. The various error terms have been defined and discussed.

The final time delay extraction process using correlation techniques is as follows: First, estimate the desired sensors time delay, to first order, using the peak correlation pulse in time, or the phase slope in frequency. This will be the initial delay guess, $\tau_{g1}$. Second, create the delay matched filter signal, with the auto-correlation peak occurring very near t=0.

$$G_i(f) = H_R(f)\cdot A\cdot H_i^*(f) e^{j\omega\tau_{g1}}$$

Third, statistically determine the best time delay by dithering $\tau_{g1}$ to maximize the figure of merit, $$FOM_i(\tau_{gi}) = \sum_{f} \frac{\mathrm{Re}[G_i(f,\tau_{gi})]}{A|H_i(f)|^2}$$

The largest $FOM_i$ yields the statistical best time delay $\tau_{gi}$. Since there are noise terms and multiple sensors present, the predicted delay accuracy can be dependent on the relative magnitudes of all of the terms.

Fourth, calculate a further refinement on the estimated delay using $G_i(f,\tau_{gi})$.

$$\theta_i(f) = \tan^{-1}[(Im(G_i(f,\tau_{gi}))/Re(G_i(f,\tau_{gi}))] = \omega\Delta\tau_E(f)$$

Then, solving for $\Delta\tau_E$ as a function of frequency yields $$\Delta\tau_{Ei}(f) = \frac{\theta_i(f)}{2\pi f}$$

To obtain the best statistical estimate of $\Delta\tau_E$, an average over frequency can be obtained as $$\Delta\tau_{Ei} = \frac{1}{N}\sum_{f=f_1}^{f_N} \frac{\theta_i(f)}{2\pi f}$$

Finally, $T_{gi} = \tau_{gi} + \Delta\tau_{Ei}$. A plot of the error time delay can show if there are any bad data points, which could then be excluded and the delay error recalculated. The plot would also confirm that the system appears stable for the extraction process.

Figure 14:
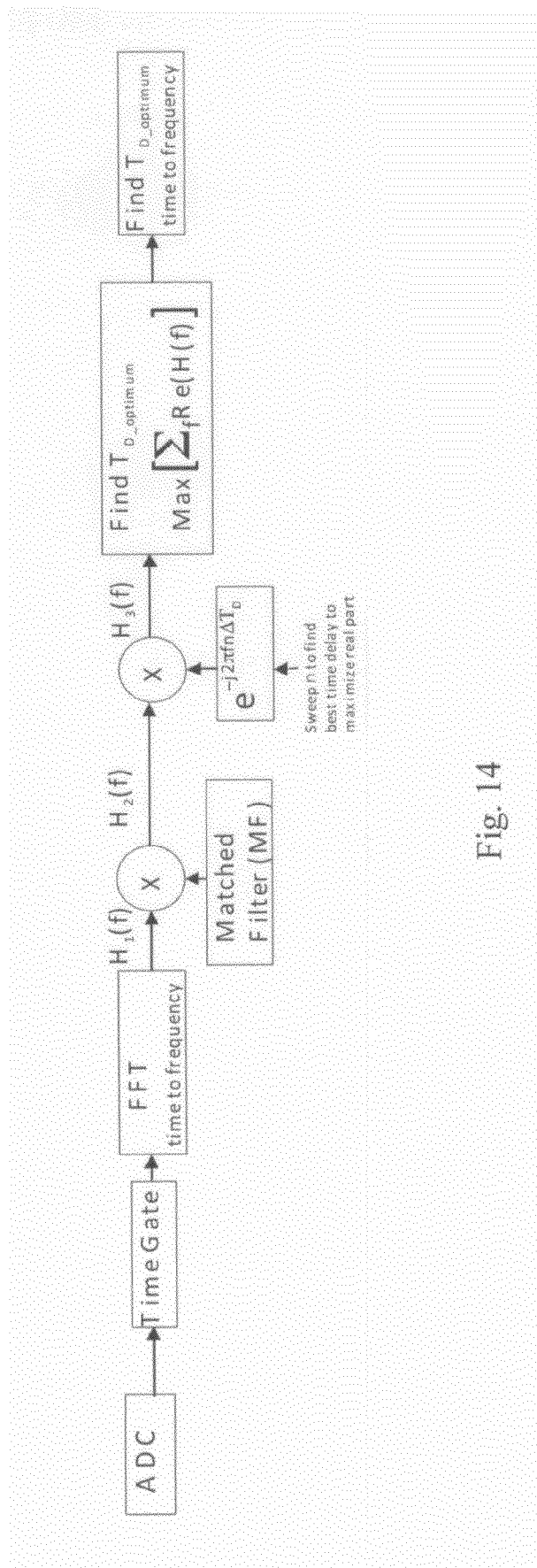
FIG. 14 is a schematic block diagram showing implementation of correlator time delay extraction.

FIG. 14 is a correlated time delay extraction implementation schematic block diagram according to a preferred embodiment of the present invention. As shown, many of the data operations are done on vector arrays, which process quickly and the majority of the operations are done in the frequency domain. The delay sweep can have any precision; it is only limited by the signal-to-noise ratio.

The system block diagram of FIG. 14 is derived to show the approach to implement the above analysis. It is assumed that the data is available from an analog-to-digital convertor (ADC) or similar detector and for the block diagram shown, it is assumed to be in the time domain. The time gate limits the time window to the ith sensor location and the time gating enhances the signal to noise, S/N, ratio. The signal data is then transformed to the frequency domain and the ith matched filter is multiplied by the signal; yielding the near ideal compressed filter correlation response. The frequency response can be either gated to the passband or the entire file processed, dependent on the nature of the data to maximize S/N. The data is then multiplied by a swept time delay in frequency; the sampling steps are set by the user and can be as fine or as course as required without regard to the original sampling rate. The vector data set is then summed and can be stored to create a data set to find the optimum delay. The optimum delay is obtained when the sum over all data points of the real part is maximized and the sum of the imaginary part is minimized. The phase response can also be examined as a final verification and the average delay, which should be small, can be added to the previously extracted delay.

Figure 15:
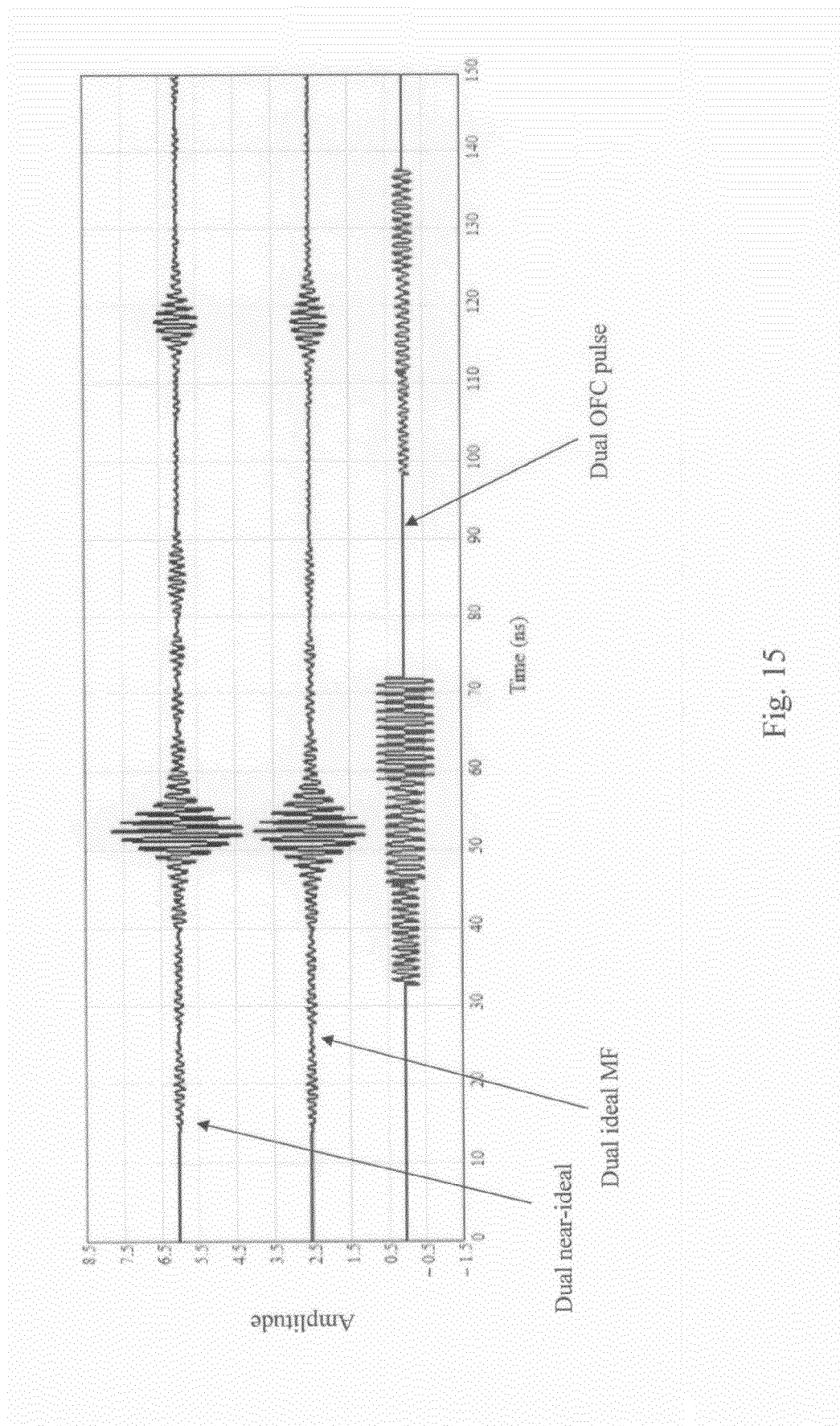
FIG. 15 is a plot showing dual OFC pulse, the dual ideal matched-filter response of the dual OCF pulses, and the dual near-ideal matched-filter response of the dual OCF pulses.

FIG. 15 is a plot showing a dual orthogonal frequency coded pulse illustrating amplitude and frequency dispersion, the dual ideal matched filter response of the dual OFC pulses, and the dual near ideal matched filter response of the dual OFC pulses.

Figure 16:
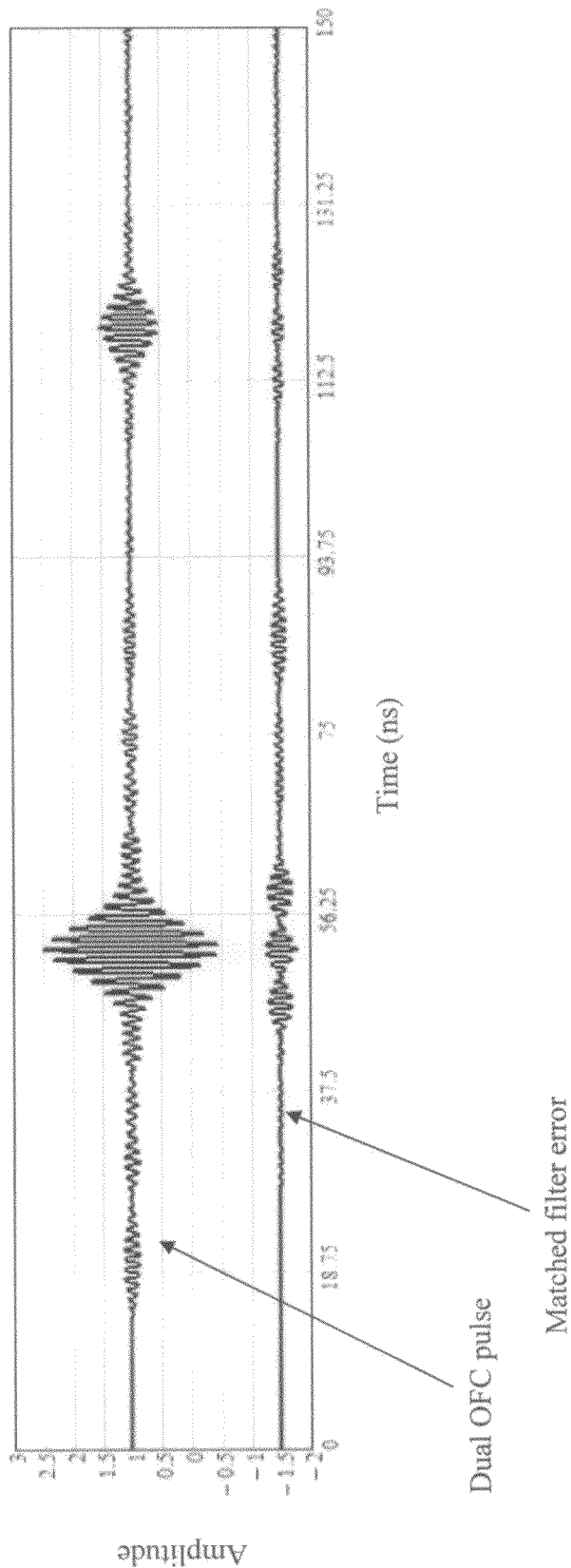
FIG. 16 is a plot showing the dual OFC pulse and the matched-filter error.

Referring to FIG. 16, the upper plot shows the dual OFC pulse showing the amplitude and frequency dispersion. The lower plot shows matched filter error, the difference between the ideal and the near-ideal matched filter responses. The error in the example is a simple amplitude mismatch on the OFC pulsed matched filter. Frequency and phase errors can cause dispersive non-symmetric errors as well.

In a two pulse analysis produces the same basic waveforms and matched filter where matched filter pulse 1 has an amplitude A and matched filter pulse 2 has an amplitude B with an average group delay as:

$$\tau_{avg.}=(A\cdot\tau_1+B\cdot\tau_2)./(A+B)$$

The advantages of using correlated time delay extraction CTDE MF matched filter include maximizing real part of the signal over frequency; minimizing imaginary part of signal over frequency; eliminating quadrature noise; summation over frequency increases the signal-to-noise ratio by a number of points for random terms; and the delay precision is determined by signal-to-noise ratio and not quantized sample steps.

Using a two pulse analysis for this example, the center of the time delay between the pulses is defined as $\tau_C$ and the pulse amplitudes are defined with peak amplitudes A and B. The average group delay of the 2-pulse system is $$\tau_{avg}=(A\cdot\tau_1+B\cdot\tau_2)/(A+B)$$

The symmetric part is defined as A=a+b and the asymmetric part is defined as B=a−b, for a, b≥0. The mid-delay between pulses is $\tau_C$ and the separation between pulses is $\Delta\tau_S$, then the compressed pulses can be separated into their even (symmetric) and odd (asymmetric) components where A=(a+b) and B=(a−b). The form of the equation is given as $$HTP_1=|H_1|^2(e^{-j\omega\tau c})\cdot 2[a\cdot\cos(\omega\Delta\tau_S)+j\cdot b\cdot\sin(\omega\Delta\tau_S)]$$

where $\Delta\tau_S$ is the delay from the center between the two pulses. Multiplying by the negative of the delay center, the equation can be simplified further into magnitude and phase as $$H'TP_1=|H_1|^2\cdot 2[a\cos(\omega\Delta\tau_S)+j\cdot b\sin(\omega\Delta\tau_S)]=|H'TP_1|\angle\Phi$$

The solution for the key parameters are $$b/a=\tan(\Phi)/\tan(\omega\Delta_S)$$

and $$|H'TP_1|^2=4a\cos(\omega\Delta\tau_S)[1+\tan^2(\Phi)]$$

Using the measured data, the statistical averaging as discussed for the single pulse case extraction of the pulse delays and pulse magnitudes is similarly accomplished. The previous analysis shows that a statistical approach provides:
1. Delay extraction using the frequency domain data;
2. Enhanced S/N by using the complete data set;
3. A method for extracting the delay by use of a matched filter;
4. A method for extracting multiple pulse data; and
5. The use of data vector arrays for fast processing.

Basic formulations and examples were for the purpose of illustration. The better the matched filter of the reference signal to the received signal, the better the extracted delay. This also means that if the error is fixed, system calibration and compensation can aid in achieving the best delay extraction. The described approach can work for any waveforms and therefore for resonant, CDMA, or OFC-like devices where windowed data is available. The co-inventors have implemented the approach . . . the multi-pulse analysis can be achieved, extracting pulse magnitude and delay. This approach can be extended for range estimation by using the interrogation pulse (IP) as the range measurement code and the OFC code to identify the device. The larger the interrogation pulse PG, the better the range accuracy.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for correlation time delay extraction from coded signals in a multi-device system, comprising the steps of:
   receiving an analog coded signal HR(J) that is a sum of plural different coded device response signals from each device in the multi-device system, each different coded device response signal each having a time delay;
   converting the received analog coded signal HR(J) to a digital data signal in a time domain;
   Fourier transforming the digital data to obtain a time domain auto-correlation peak, and
   match filtering each of the received plural different coded signals to extract the time delay from each different coded response signal to recover each original different coded signal.

2. The method of claim 1 further comprising the step of:
   calibrating each matched filter to one of the plural different coded signals to improve the delay extraction.

3. The method of claim 1 wherein the matched filtering step includes the steps of:
   processing a magnitude of each received different coded device response signal; and
   processing a phase of each received different coded device response signal to eliminating an imaginary term by extracting the time delay from each received different coded device response signal.

4. The method of claim 1 further comprising the steps of:
   estimating the delay time using a passband frequency phase slope in the frequency domain; and
   creating a delay matched filter.

5. The method of claim 1 further comprising the steps of:
   estimating of the delay time using the correlation peak in the time domain; and
   creating a delay matched filter signal with an auto-correlation peak occurring at approximately t=0.

6. The method of claim 1 further comprising the step of:
   multiplying a last one of the matched filters to the transformed digital data signal to obtain a compressed filter correlation response.

7. The method of claim 6 further comprising the step of:
multiplying the compressed filter correlation response by a time sweep to determine a real part of the time delay.

8. The method of claim 7 further comprising the step of:
summing the real part of the time delay for each compressed filter correlation response to obtain an optimum time delay.

9. The method of claim 8 further comprising the step of:
converting the optimum time delay from the time domain to a frequency domain.

10. A correlated time delay extraction for acoustic devices in a multi-device system comprising:
plural acoustic devices each generating and transmitting a different analog coded signal in response to receiving an interrogation signal, each different coded signal having a time delay to spread a device energy in time in the multi-device system;
a receiver for receiving an analog signal as a sum of the plural different analog coded signals, the receiver including a processing device including memory for storing and executing a set of instructions to extract a correlated time delay; and
a correlator time delay extractor including a matched-filter corresponding to each one of the different coded signals to extract the time delay for recovering recover the original different analog coded signals.

11. The system of claim 10 wherein the receiver includes:
a converter to convert the received analog coded signal to a digital data signal.

12. The system of claim 11 wherein the set of instructions comprises:
a first set of instructions to Fourier transform the digital data signal from a time domain to a frequency domain.

13. The system of claim 12 further comprising:
a second set of instructions to multiply a last one of the matched filters to the transformed digital data signal to obtain a compressed filter correlation response.

14. The system of claim 13 further comprising:
a third set of instructions to multiply the compressed filter correlation response by a time sweep to determine a real part of the time delay.

15. The system of claim 14 further comprising:
a fourth set of instructions to sum the real part of the time delay for each compressed filter correlation response to obtain an optimum time delay.

16. The system of claim 15 further comprising:
a fifth set of instructions to convert the optimum time delay from the time domain to a frequency domain.

17. A correlated time delay extraction system comprising:
a receiver to receive an analog signal as a sum of plural coded signals each having a different time delay generated and transmitted from plural acoustic devices in response to an interrogation;
a detector in the time domain to convert the received analog signal to a digital signal data;
a time gate to limit a time window to an ith acoustic device; and
a Fourier transforming device to transform the digital data signal from the time domain to a frequency domain, and
a matched filter corresponding each acoustic device coded signal to remove each different time delay to recover each original coded signal.

18. The system of claim 17 wherein the detector comprises:
an analog to digital converter.

19. The system of claim 17 wherein the matched filter comprises:
a matched filter multiplier for multiplying each transformed digital data signal by an ith matched filter to obtain an approximate compressed filter correlation response data;
a time sweep multiplier to multiply the approximate compressed filter correlation response data by a swept time delay in frequency to determine a maximum real part over a frequency band that provides a best statistical value of the time delay; and
a summing device or algorithm to sum a real part of the amplitude of a plurality of samples in the frequency band to determine a best estimate of the time delay when the sum is at a largest value,
wherein each code of the plural coded signals is processed to find an optimum delay.

* * * * *